United States Patent
Sakoda et al.

(10) Patent No.: US 10,282,619 B2
(45) Date of Patent: May 7, 2019

(54) PROCESSING APPARATUS, STORAGE MEDIUM, AND CONTROL METHOD

(71) Applicant: SONY CORPORATION, Tokyo (JP)

(72) Inventors: Kazuyuki Sakoda, Chiba (JP); Masakazu Yajima, Chiba (JP); Mitsuru Takehara, Tokyo (JP); Yuki Koga, Tokyo (JP); Tomoya Onuma, Shizuoka (JP); Akira Tange, Tokyo (JP); Takatoshi Nakamura, Tokyo (JP)

(73) Assignee: SONY CORPORATION, Tokyo (JP)

( * ) Notice: Subject to any disclaimer, the term of this patent is extended or adjusted under 35 U.S.C. 154(b) by 291 days.

(21) Appl. No.: 15/120,831

(22) PCT Filed: Dec. 5, 2014

(86) PCT No.: PCT/JP2014/082298
§ 371 (c)(1),
(2) Date: Aug. 23, 2016

(87) PCT Pub. No.: WO2015/136796
PCT Pub. Date: Sep. 17, 2015

(65) Prior Publication Data
US 2016/0364615 A1 Dec. 15, 2016

(30) Foreign Application Priority Data
Mar. 10, 2014 (JP) ................................ 2014-046371

(51) Int. Cl.
*H04L 21/00* (2006.01)
*G06K 9/00* (2006.01)
(Continued)

(52) U.S. Cl.
CPC ..... *G06K 9/00771* (2013.01); *H04N 1/00103* (2013.01); *H04N 1/00244* (2013.01);
(Continued)

(58) Field of Classification Search
CPC ............ H04N 1/2112; H04N 1/00244; H04N 1/00103
See application file for complete search history.

(56) References Cited

U.S. PATENT DOCUMENTS

| 7,440,594 | B2 * | 10/2008 | Takenaka | ........... G06K 9/00221 382/118 |
| 2003/0051255 | A1 * | 3/2003 | Bulman | ................. G06Q 30/00 725/135 |

(Continued)

FOREIGN PATENT DOCUMENTS

| JP | 2001-177750 A | 6/2001 |
| JP | 2002-281486 A | 9/2002 |

(Continued)

OTHER PUBLICATIONS international Search Report dated Mar. 3. 2015 in PCT/JP2014/082298 filed Dec. 5, 2014.

*Primary Examiner* — Morshed Mehedi
(74) *Attorney, Agent, or Firm* — Xsensus LLP

(57) ABSTRACT

An information processing apparatus configured to detect an object from which an individual is identifiable from captured image data, store information from which the object is restorable in memory and transmit image data generated by omitting the information regarding the object to a server. The information processing apparatus also detects the existence of a wireless terminal and controls deletion of the information regarding the object based on a privacy level associated with the wireless terminal.

14 Claims, 12 Drawing Sheets

(51) Int. Cl.
*H04N 7/18* (2006.01)
*H04N 5/232* (2006.01)
*H04N 1/00* (2006.01)
*H04N 1/21* (2006.01)

(52) U.S. Cl.
CPC ....... *H04N 1/2112* (2013.01); *H04N 5/23219* (2013.01); *H04N 5/23229* (2013.01); *H04N 7/181* (2013.01); *H04N 2201/218* (2013.01)

(56) References Cited

U.S. PATENT DOCUMENTS

| | | | | |
|---|---|---|---|---|
| 2004/0081338 | A1* | 4/2004 | Takenaka | G06K 9/00221 382/118 |
| 2005/0002585 | A1* | 1/2005 | Brauckmann | H04N 7/1675 382/254 |
| 2007/0064974 | A1* | 3/2007 | Ayachitula | G06F 17/3079 382/103 |
| 2009/0010570 | A1* | 1/2009 | Yamada | G06K 9/00221 382/312 |
| 2009/0207269 | A1* | 8/2009 | Yoda | G06T 11/60 348/222.1 |
| 2014/0201844 | A1* | 7/2014 | Buck | G06F 21/50 726/26 |
| 2014/0368807 | A1* | 12/2014 | Rogan | G01S 17/50 356/28 |
| 2015/0085163 | A1* | 3/2015 | Aimi | H04N 5/23219 348/234 |
| 2016/0055064 | A1* | 2/2016 | Gostev | G06F 11/1448 726/4 |

FOREIGN PATENT DOCUMENTS

| | | |
|---|---|---|
| JP | 2005-080156 A | 3/2005 |
| JP | 2006-217161 A | 8/2006 |
| JP | 2009-033738 A | 2/2009 |
| JP | 2009-194687 A | 8/2009 |

* cited by examiner

| OBJECT IMAGE 1 | OBJECT ID 1 | DEVICE ID 1 |
| --- | --- | --- |
| OBJECT IMAGE 2 | OBJECT ID 2 | DEVICE ID 3 |
| ... | ... | ... |

| OBJECT ID 1 | DEVICE ID 1 | STATIONARY CAMERA10A-2014/2/17 10:30:45 |
| --- | --- | --- |
| OBJECT ID 2 | DEVICE ID 3 | STATIONARY CAMERA10A-2014/2/17 10:30:50 |
| OBJECT ID 3 | DEVICE ID 4 | STATIONARY CAMERA10A-2014/2/18 13:20:00 |
| OBJECT ID 4 | DEVICE ID 4 | STATIONARY CAMERA10B-2014/2/18 14:00:30 |

351b

| DEVICE ID 1 | PRIVACY LEVEL "LOW" |
| --- | --- |
| DEVICE ID 2 | PRIVACY LEVEL "HIGH" |
| DEVICE ID 3 | PRIVACY LEVEL "LOW" |
| DEVICE ID 4 | PRIVACY LEVEL "LOW" |

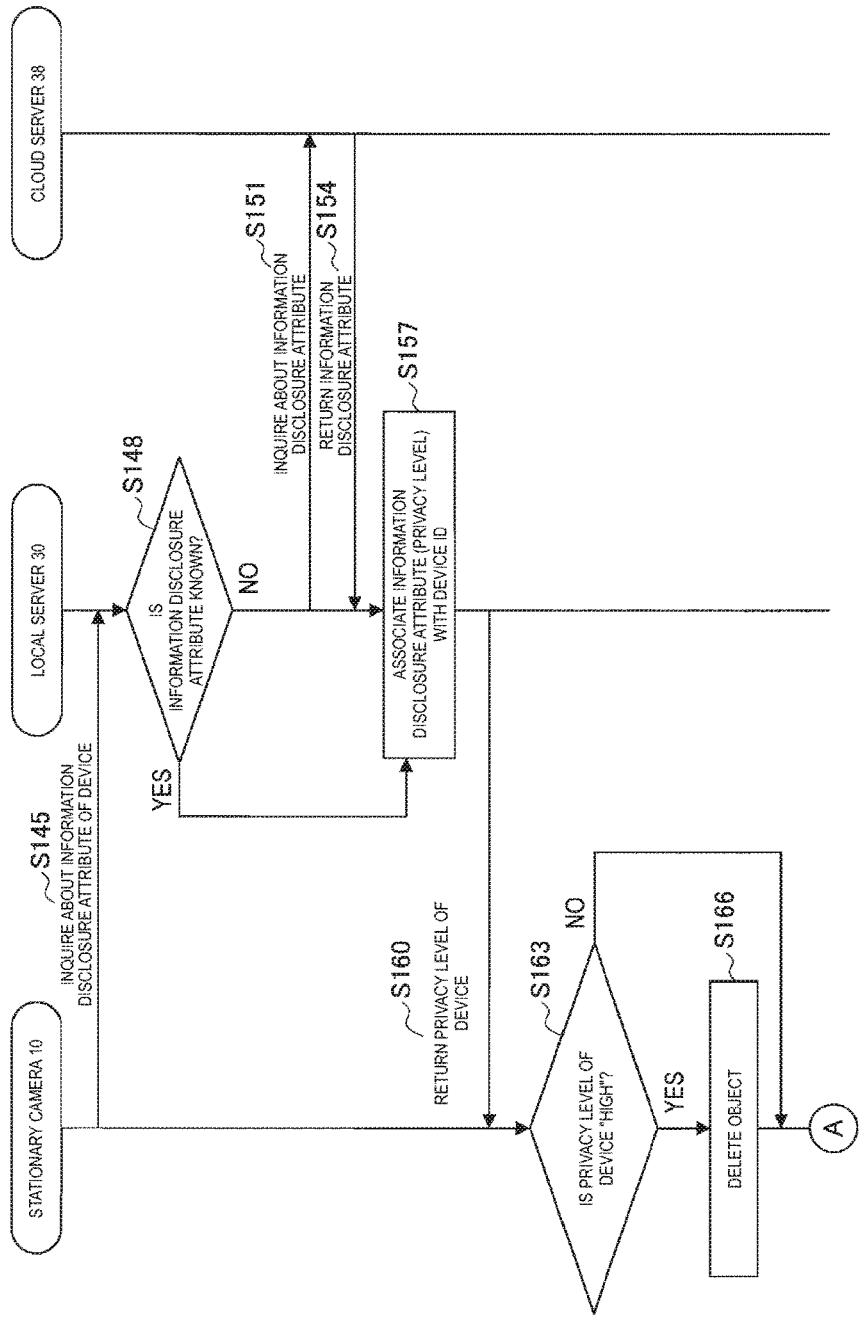

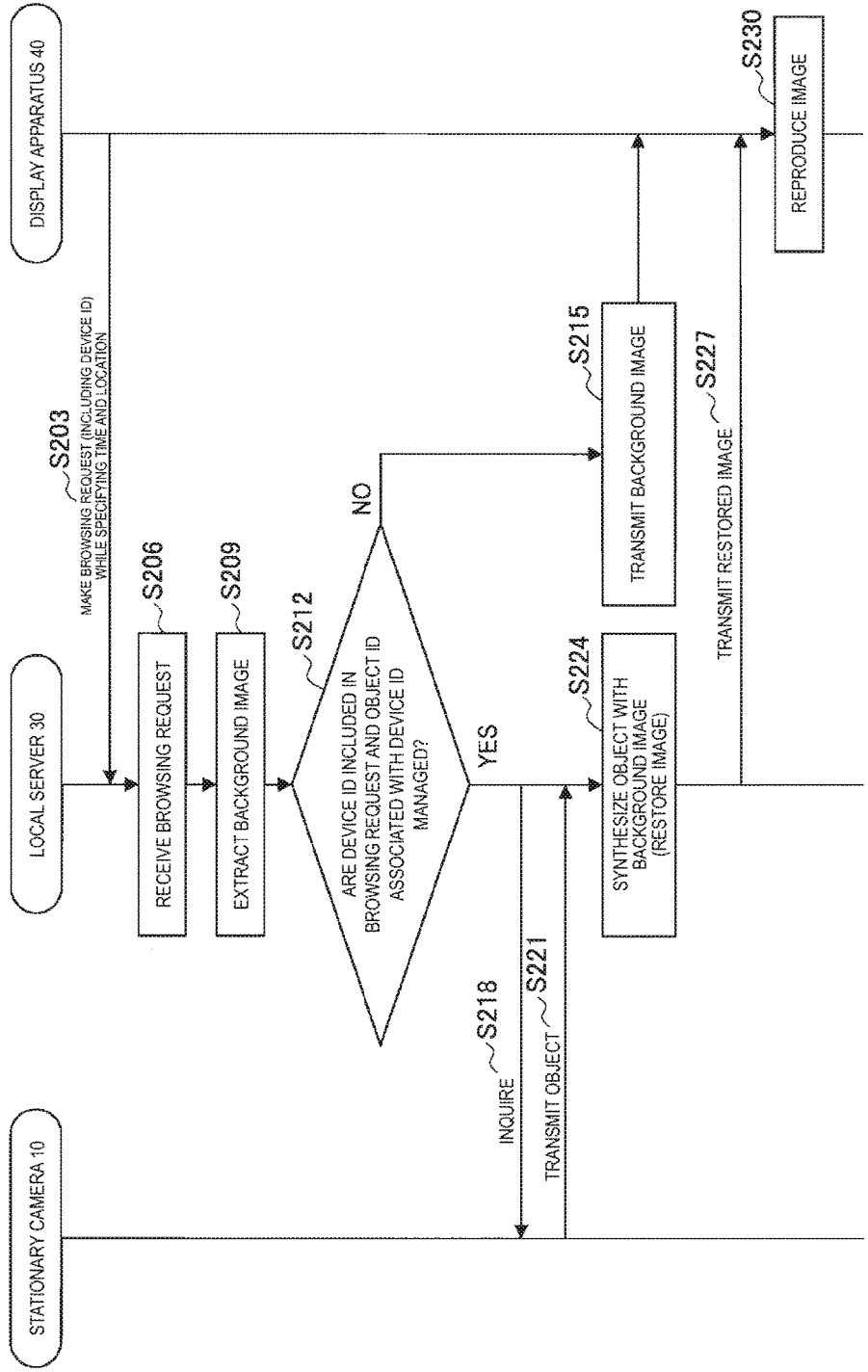

PROCESSING APPARATUS, STORAGE MEDIUM, AND CONTROL METHOD

TECHNICAL FIELD

The present disclosure relates to an information processing apparatus, a storage medium, and a control method.

BACKGROUND ART

In recent years, as a security camera system, a camera system which includes a plurality of stationary cameras provided at specific locations, and which picks up images of circumferences is utilized for various applications. For example, a plurality of stationary cameras are provided at specific locations in a building, a shopping mall, a theme park, a sightseeing place, an airport, or the like, and managed by local servers at respective locations.

Further, when a local server which manages a camera is connected to an external network and also communicates with a cloud server, a large amount of picked up images are transferred to the cloud server, and can be browsed at an external monitor.

Concerning such a camera system, for example, the following Patent Literature 1 discloses an image photographing system in which communication devices such as wireless tags are distributed only to visitors which are photographing targets, and photographing is performed based on detection of identification information issued from the communication devices.

CITATION LIST

Patent Literature

Patent Literature 1: JP 2001-177750A

SUMMARY OF INVENTION

Technical Problem

However, with the above-described camera system, because photographed images are transferred to a cloud server and can be browsed at an external monitor, personal information, for example, who is where, or, whom a person has met, has been known by the third party.

Further, with the image photographing system disclosed in Patent Literature 1, while there is no problem for a user who is a receiver of service, there is a possibility that another user present near the user who is the service receiver may be photographed, in which case a problem of invasion of privacy for the another user may arise.

Therefore, the present disclosure proposes an information processing apparatus, a storage medium, and a control method, which can realize both prevention of invasion of privacy and distribution of a picked up image by distributing an image after performing processing of missing an object from which an individual can be identified from the picked up image.

Solution to Problem

According to the present disclosure, there is provided an information processing apparatus including an object detecting unit configured to detect an object from which an individual is identifiable from image data picked up by an image pickup unit, a storage control unit configured to store information from which the object is restorable in a storage unit, and a communication control unit configured to perform control to transfer to a server, image data generated by missing information regarding the object from which the individual is identifiable from the image data.

According to the present disclosure, there is provided an information processing apparatus including a communication control unit configured to receive from an external apparatus, image data in which information regarding an object from which an individual is identifiable is missed from image data picked up by an image pickup unit, and a storage control unit configured to assign an object ID to a region corresponding to the object from which the individual is identifiable and store the object ID in a storage unit in association with the image data. The communication control unit performs control to return the object ID to the external apparatus.

According to the present disclosure, there is provided a storage medium storing a program for making a computer function as an object detecting unit configured to detect an object from which an individual is identifiable from image data picked up by an image pickup unit, a storage control unit configured to store information from which the object is restorable in a storage unit, and a communication control unit configured to perform control to transfer to a server, image data generated by missing information regarding the object from which the individual is identifiable from the image data.

According to the present disclosure, there is provided a control method including receiving from an external apparatus, image data in which information regarding an object from which an individual is identifiable is missed from image data picked up by an image pickup unit, assigning an object ID to a region corresponding to the object from which the individual is identifiable and storing the object ID in a storage unit in association with the image data, and performing control to return the object ID to the external apparatus.

Advantageous Effects of Invention

According to the present disclosure as described above, it is possible to realize both prevention of invasion of privacy and distribution of a picked up image by distributing an image after performing missing an object from which an individual can be identified from the picked up image.

The above-described advantageous effect is not necessarily limitative, and along with the above-described advantageous effect or in place of the above-described advantageous effect, any advantageous effect described in the present specification or other advantageous effects which can be recognized from the present specification may be provided.

BRIEF DESCRIPTION OF DRAWINGS

FIG. 9 is a diagram explaining a data configuration example of a storage unit of the local server according to the present embodiment.

FIG. 12 is a sequence diagram illustrating processing (deletion processing) upon acquisition of a picked up image according to the present embodiment.

FIG. 13 is a sequence diagram illustrating processing upon browsing of a picked up image according to the present embodiment.

DESCRIPTION OF EMBODIMENT

Hereinafter, a preferred embodiment of the present disclosure will be described in detail with reference to the appended drawings. In this specification and the drawings, elements that have substantially the same function and structure are denoted with the same reference signs, and repeated explanation is omitted.

Further, description will be provided in the following order.
1. Outline of Camera System According to Embodiment of Present Disclosure
2. Basic Configuration
2-1. Configuration Example of Stationary Camera
2-2. Configuration Example of Local Server
3. Operation Processing
3-1. Processing upon Acquisition of Picked up Image
3-2. Processing upon Browsing of Picked up Image
4. Conclusion

1. OUTLINE OF CAMERA SYSTEM ACCORDING TO EMBODIMENT OF PRESENT DISCLOSURE

Figure 1:
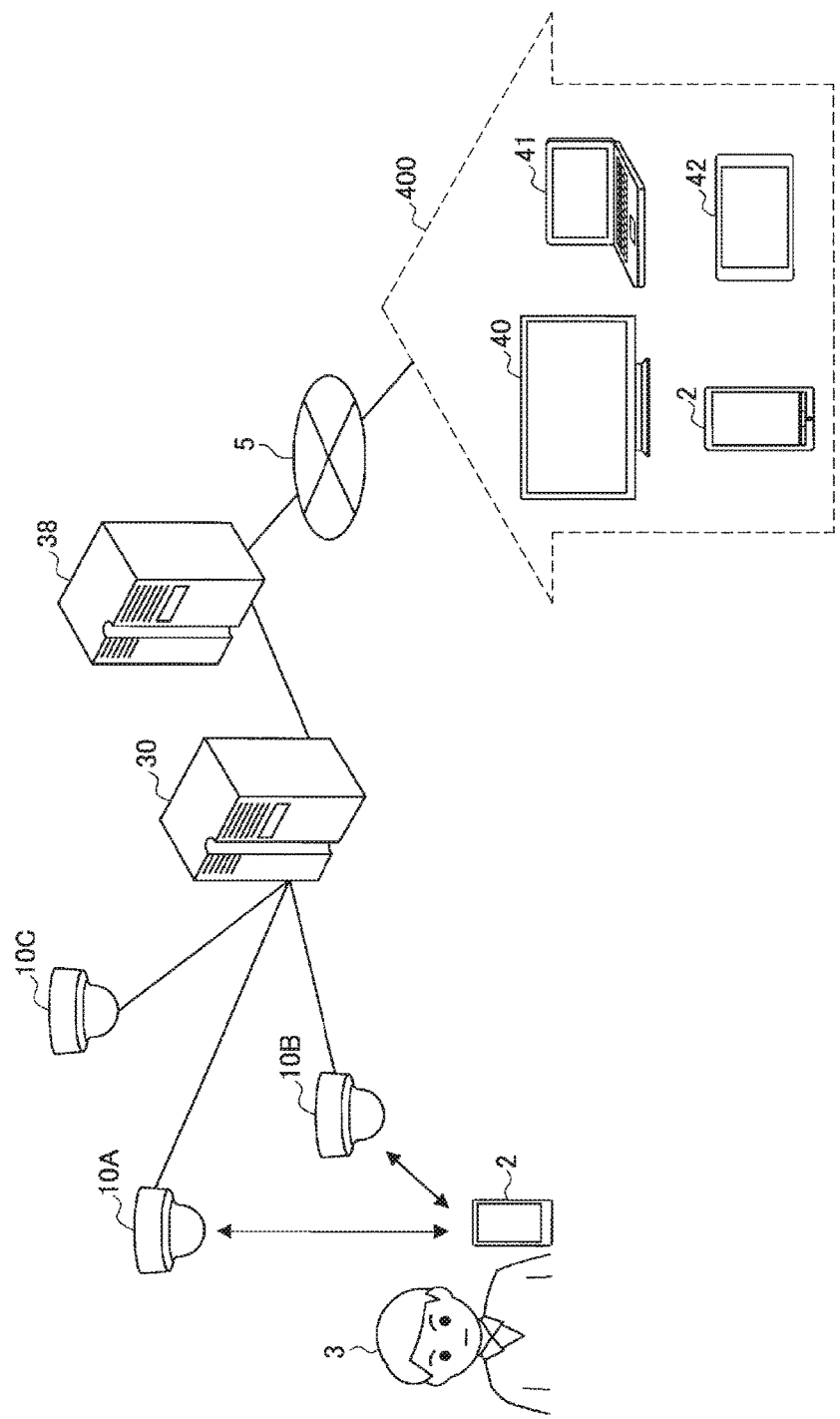
FIG. 1 is a diagram illustrating an overall configuration of a camera system according to one embodiment of the present disclosure.

First, outline of a camera system according to an embodiment of the present disclosure will be described with reference to FIG. 1. FIG. 1 is a diagram illustrating an overall configuration of the camera system according to an embodiment of the present disclosure.

As illustrated in FIG. 1, the camera system according to the present embodiment includes a plurality of stationary cameras 10A to 10C, a local server 30 and a cloud server 38.

The stationary cameras 10A to 10C are security cameras, fixed point cameras, or the like, which are attached to ceiling, wall, or the like, of specific locations and continuously pick up images of circumferences. Further, the stationary cameras 10A to 10C can communicate with an information processing terminal (for example, a smartphone 2) of a subject (user 3) and acquire device information.

The local server 30 manages the plurality of stationary cameras 10A to 10C. Further, the local server 30 is provided at a location near this camera group. In the example illustrated in FIG. 1, while only one pair of one camera group (stationary cameras 10A to 10C) and the local server 30 which manages this camera group is illustrated, a plurality of local servers, including, for example, a local server which manages a camera group provided at a theme park and a local server which manages a camera group provided at a shopping mall, can exist. These plurality of local servers also function as gateways which interact with an external network and communicate with the cloud server 38.

Further, the local server 30 transfers picked up images acquired from the stationary cameras 10A to 10C to the cloud server 38.

The cloud serer 38 stores an information disclosure attribute (privacy level) of the smartphone 2. The information disclosure attribute can be registered in advance by, for example, the user 3. Further, the cloud server 38 provides a picked up image transferred from the local server 30 in response to access from an external monitor such as a display apparatus 40, a personal computer (PC) 41, a tablet terminal 42 and the smartphone 2 of general household 400. It should be noted that, in the example illustrated in FIG. 1, while the local server 30 and the cloud server 38 are separate apparatuses, the local server 30 may include functions of the cloud server 38.

The display apparatus 40 (such as a television apparatus, a projector for household use and a wall display) of the general household 400 is connected to a network 5 via a digital subscriber line (DSL). Further, the PC 41, the tablet terminal 42, the smartphone 2, or the like, are connected to the network 5 via a mobile phone network. By this means, the user 3 can browse images picked up with the stationary cameras 10A to 10C while the user 3 is out by accessing the cloud server 38 or the local server 30 from the external monitor such as the display apparatus 40, the PC 41, the tablet terminal 42 and the smartphone 2 after the user 3 comes home.

(Background)

Figure 2:
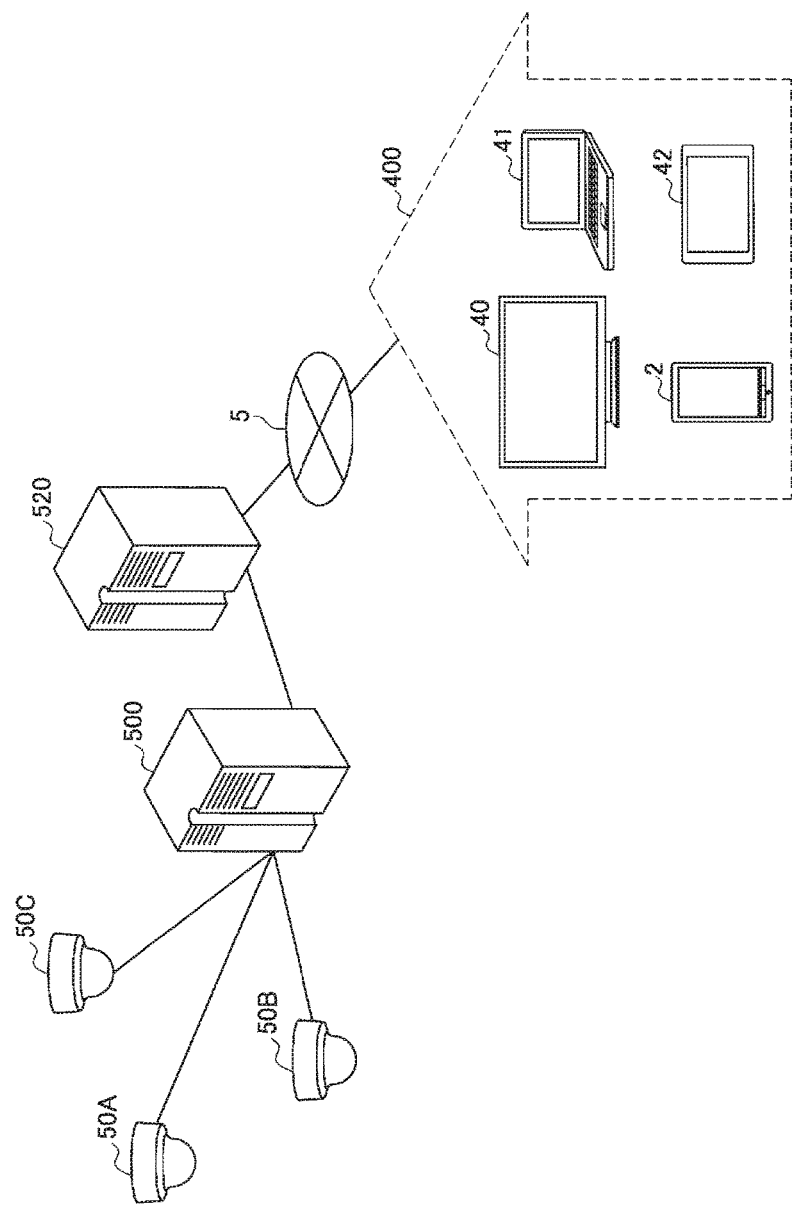
FIG. 2 is a diagram explaining a camera system of related art.

Here, a camera system of related art will be described with reference to FIG. 2. As illustrated in FIG. 2, the camera system of related art includes stationary cameras 50A to 50C, a local server 500 and a cloud server 520.

The stationary cameras 50A to 50C transmit picked up images as is to the local server 500, and the local server 500 also transfers the collected picked up images as is to the cloud server 520.

The picked up images transferred to the cloud server 520 are provided in response to access from the external monitor such as the display apparatus 40, and the user can browse the images picked up with the stationary cameras 50A to 50C using the display apparatus 40.

In this manner, with the camera system of related art, because the images picked up with the stationary cameras 50A to 50C are provided as is to the external monitor without being subjected to any processing, or the like, personal information, for example, who is where, when, is known to the third party. Further, while there is no problem for a receiver of service which provides a picked up image through the above-described camera system, because a picked up image in which a person present near the receiver is photographed is also provided, there is concern about invasion of privacy.

Therefore, in the present embodiment, a camera system which realizes both prevention of invasion of privacy and distribution of a picked up image is provided by distributing an image after performing processing of missing an object from which an individual can be identified (a portion where there is concern about invasion of privacy) from the picked up image. Outline of the camera system according to the present embodiment will be described below with reference to FIG. 3 to FIG. 4.

Figure 3:
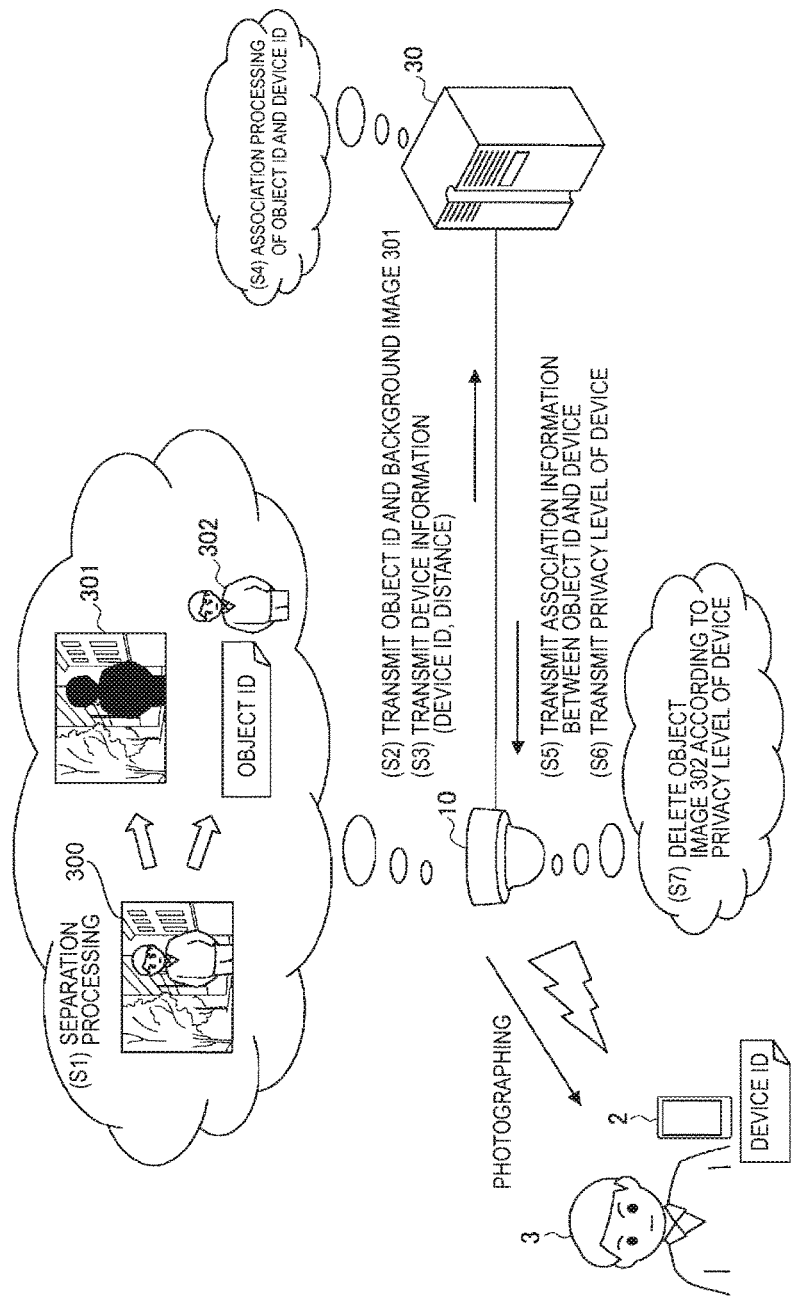
FIG. 3 is a diagram explaining outline upon acquisition of a picked up image in the camera system according to the present embodiment.

FIG. 3 is a diagram explaining outline upon acquisition of a picked up image in the camera system according to the present embodiment. As illustrated in FIG. 3, the stationary camera 10 picks up an image of the user 3 to acquire the picked up image 300. The stationary camera 10 performs processing of cutting out a dynamic object such as a person and separating an object portion (hereinafter, referred to as an "object image 302") from the other portion (hereinafter, referred to as a "background image 301") on the picked up image 300 (step S1). Further, the stationary camera 10 assigns an object ID to the separated object image 302. The background image 301 is an image in which an object from which an individual can be identified (a portion where there is concern about invasion of privacy) is missed, and, a silhouette (in which a portion where the object is cut out is pasted) as illustrated in, for example, FIG. 3, as well as an image for which there is no concern about invasion of privacy, such as a predetermined avatar and an imaginary person, may be synthesized at the missed portion, or the missed portion may be subjected to mosaic processing or airbrushing processing.

The stationary camera 10 then transmits an object ID and the background image 301 to the local server 30 (step S2).

In parallel with the above-described photographing and separation processing, the stationary camera 10 can communicate with an information processing terminal (for example, the smartphone 2) of the user 3 by always trying communication with an information processing terminal present in the vicinity and acquire device information. The device information includes a device ID (such as, for example, a phone number, user name and a password). Further, the stationary camera 10 extracts distance information between the stationary camera 10 and the smartphone 2 from signal strength, delay time of transmission and reception of a signal, or the like, based on communication with the smartphone 2.

The stationary camera 10 then transmits the device ID and the distance information to the local server 30 as device information (step S3).

The local server 30 then associates an object (an object ID) corresponding to the missed portion of the background image 301 with a device ID based on the device information, the background image 301 and the object ID received from the stationary camera 10 (step S4). Specifically, the local server 30 judges which object of the background image 301 is an owner of the smartphone 2 indicated in the device ID using the distance information (distance between the stationary camera 10 and the smartphone 2) included in the device information. At this time, while the object portion from which the user 3 can be identified is missed, the object portion can be recognized as a missed portion (a silhouette or a portion subjected to mosaic processing).

The local server 30 then transmits association information (mapping information) between the object ID and the device ID to the stationary camera 10 (step S5).

Further, the local server 30 acquires an information disclosure attribute (hereinafter, referred to as a "privacy level") of a device (smartphone 2) with which the stationary camera 10 communicates in parallel with the above-described association processing and transmits this information disclosure attribute to the stationary camera 10 (step S6). The privacy level is, for example, information registered in advance by the user and used for setting whether or not to disclose (release) an image of the user himself/herself (an object from which the user can be identified) included in a picked up image when the image is picked up with the stationary camera 10. Further, when it is set that the image of the user is disclosed, it is possible to set a disclosure level, for example, whether the image is disclosed only to the user himself/herself or disclosed to specific other persons.

The stationary camera 10 deletes the object image 302 corresponding to the object ID associated with the device ID of the device according to the privacy level of the device transmitted from the local server 30. For example, when the privacy level of the smartphone 2 of the user 3 is set at "high" (disclosure is not allowed), the stationary camera 10 deletes the object image 302 (a picked up image which is separated from the picked up image 300 and from which the user 3 can be identified) associated with the smartphone 2. By this means, by setting the privacy level at "high" in advance, it is possible to make the stationary camera 10 delete information (a picked up image of himself/herself) from which the user himself/herself is identified also when the image is picked up with the stationary camera 10.

Further, when the privacy level of the smartphone 2 is "low" (disclosure is allowed), the stationary camera 10 stores the object image 302 associated with the smartphone 2. When the privacy level is set at "low" and the object image 302 is stored, the user 3 can browse the picked up image picked up with the stationary camera 10 from an external monitor later. Browsing of the picked up image will be described below with reference to FIG. 4.

Figure 4:
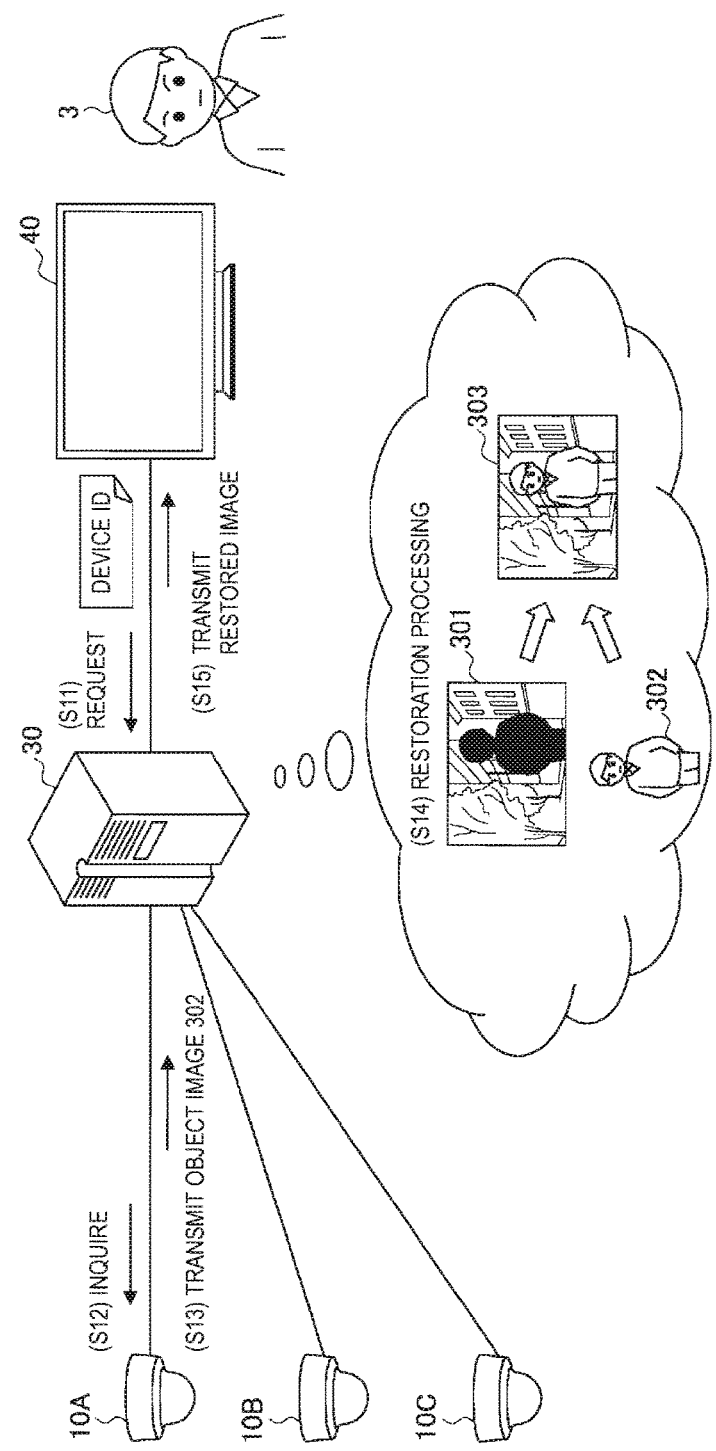
FIG. 4 is a diagram explaining outline upon browsing of a picked up image in the camera system according to the present embodiment.

FIG. 4 is a diagram explaining outline upon browsing of a picked up image in the camera system according to the present embodiment. As illustrated in FIG. 4, the user 3 makes a request for browsing the picked up image from the display apparatus 40 (an example of the external monitor) to the local server 30. At this time, the user 3 transmits the device ID (such as, for example, a phone number, user name and a password) of the smartphone of the user 2 (step S11). It should be noted that, while, as illustrated in FIG. 1, the camera system according to the present embodiment includes the cloud server 38, and the display apparatus 40 provided at the general household 400 accesses the local server 30 via the cloud server 38 connected to the network 5, the cloud server 38 is omitted in the schematic diagram illustrated in FIG. 4.

Subsequently, the local server 30 makes an inquiry to the stationary camera 10A which stores the object image 302 indicated with the object ID associated with the object ID according to the device ID included in the request (step S12).

Subsequently, the stationary camera 10A transmits the object image 302 indicated with the object ID associated with the device ID to the local server 30 in response to the inquiry from the local server 30 (step S13).

Subsequently, the local server 30 generates a restored image 303 by synthesizing the stored background image 301 with the received object image 302 and transmits the restored image 303 to the display apparatus 40. By this means, the user 3 can browse the restored image 303 in which the user 3 himself/herself is photographed at the display apparatus 40.

As described above, in the camera system according to the present embodiment, it is possible to miss information from which an individual is identified from a picked up image picked up with the stationary camera 10 according to a privacy level. Further, the user who desires to browse the picked up image later can browse the image in which the user himself/herself is photographed through restoration processing at a later date by setting the privacy level at low and storing the separated picked up image of the user himself/herself (the object image 302) in the stationary camera 10. Further, to a person who does not have access authority (a person to whom the image is not allowed to be released by the privacy level), the local server 30 does not perform restoration processing and provides the background image 301 (an image in which the object image 302 is missed), it is possible to protect privacy of the user.

2. BASIC CONFIGURATION

<2-1. Configuration Example of Stationary Camera>

Figure 5:
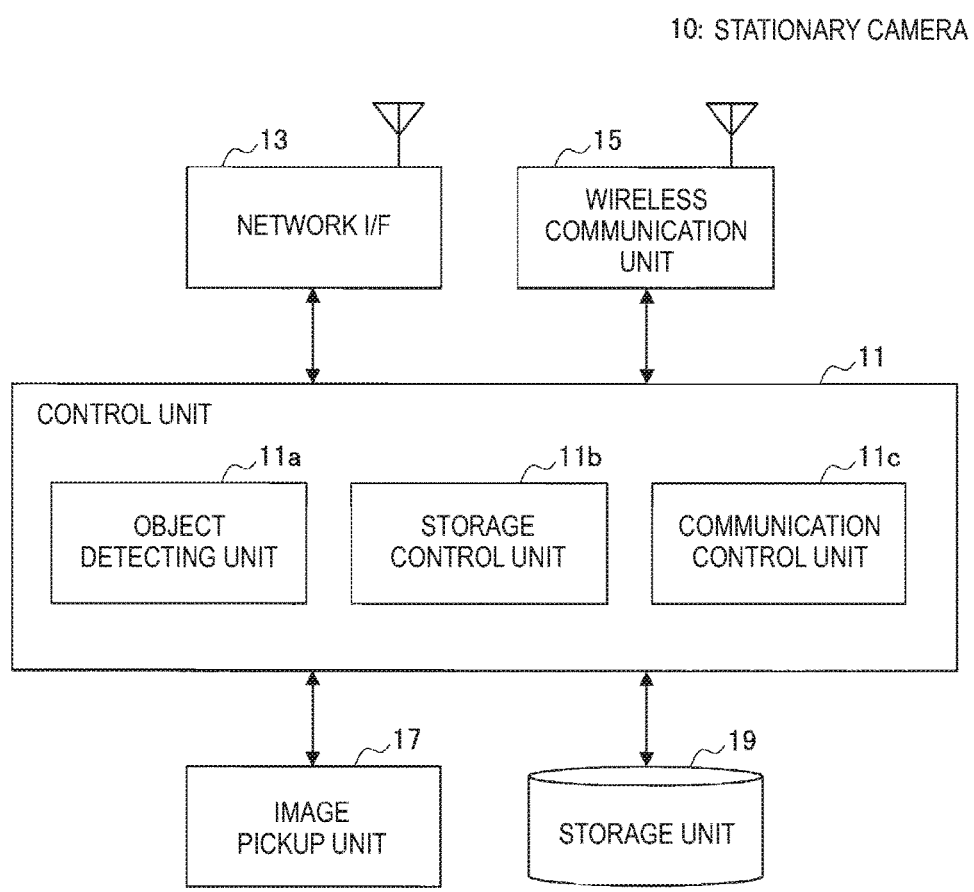
FIG. 5 is a block diagram illustrating a basic configuration example of a stationary camera according to the present embodiment.

A configuration of the stationary camera 10 included in the camera system according to the present embodiment will be described next with reference to FIG. 5. FIG. 5 is a block diagram illustrating a basic configuration example of the stationary camera 10 according to the present embodiment.

As illustrated in FIG. 5, the stationary camera 10 includes a control unit 11, a network interface (I/F) 13, a wireless communication unit 15, an image pickup unit 17 and a storage unit 19.

The control unit 11 is configured with a microcomputer including, for example, a central processing unit (CPU), a read only memory (ROM), a random access memory (RAM), a non-volatile memory and an interface unit, and controls each component of the stationary camera 10.

Further, as illustrated in FIG. 5, the control unit 11 according to the present embodiment functions as an object detecting unit 11a, a storage control unit 11b and a communication control unit 11c. The object detecting unit 11a detects an object from which an individual can be identified from image data picked up by the image pickup unit 17. Specifically, the object detecting unit 11a detects an object of a person among the dynamic object and extracts the detected object of the person. Further, the object detecting unit 11a assigns an object ID to the detected object.

(Detection of Object)

Figure 6:
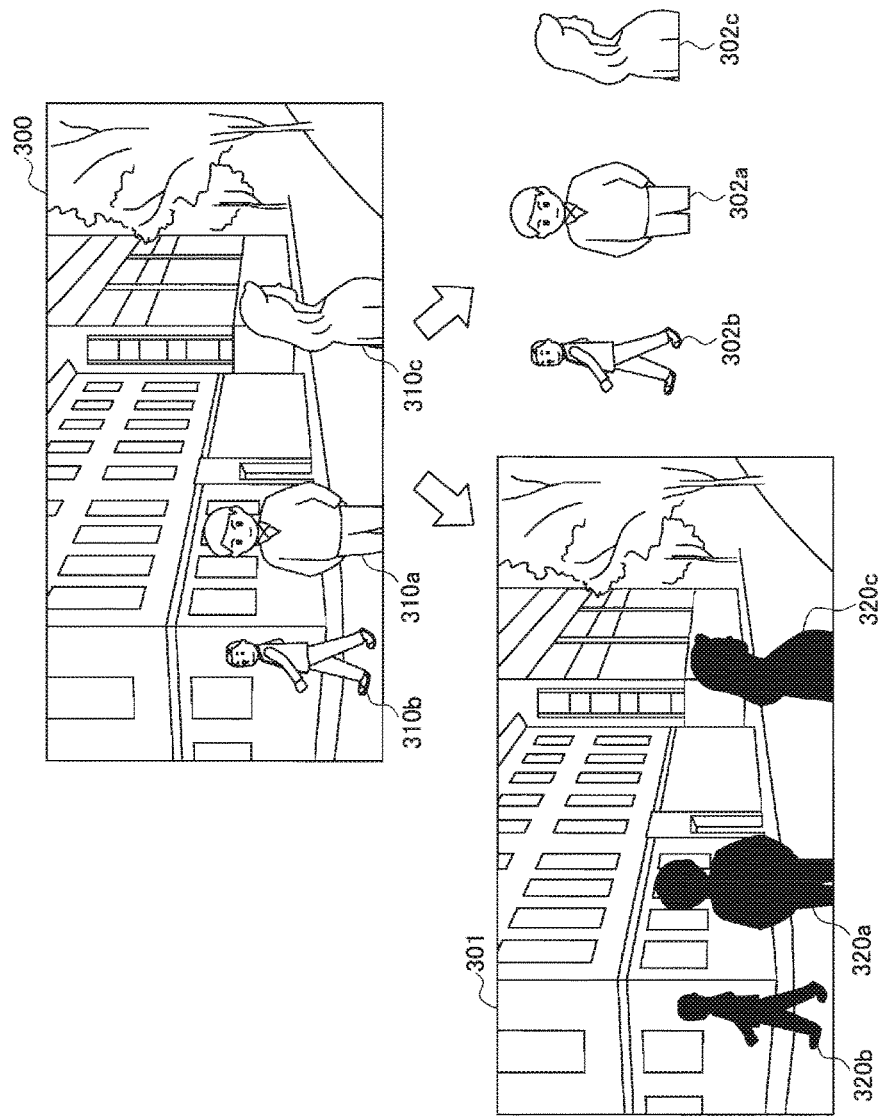
FIG. 6 is a diagram explaining detection of an object by an object detecting unit according to one embodiment of the present disclosure.

Detection of an object by the object detecting unit 11a will be described here with reference to FIG. 6. As illustrated in FIG. 6, the object detecting unit 11a detects objects 310a, 310b and 310c of persons which are dynamic objects from the picked up image 300 picked up with the stationary camera 10. Because the stationary camera 10 continuously picks up images of the circumferences, the object detecting unit 11a can recognize motionless objects (background such as buildings, trees and roads) and active objects (such as persons and cars).

Then, as illustrated in the lower part of FIG. 6, object images 302a to 302c including information from which an individual can be identified are extracted from the picked up image 300, and the background image 301 in which the object images 302a to 302c are missed is generated. As illustrated in FIG. 6, in the background image 301, regions corresponding to the object images 302a to 302c become silhouettes (shadow objects) 320a to 320c and information from which an individual can be identified is missed.

The storage control unit 11b performs control to record information which can be used for restoring an object missed from the picked up image in the storage unit 19. For example, the storage control unit 11b stores the object image 302 detected (extracted) from the picked up image 300 by the object detecting unit 11a in the storage unit 19. Alternatively, when an avatar is synthesized for a person object or mosaic processing, airbrushing processing, or the like, is performed as a background image in which information from which an individual can be identified is missed, the storage control unit 11b stores information for restoring these in the storage unit 19. It should be noted that a storage location of the information which can be used for restoring an object missed from the picked up image is not limited to the storage unit 19 built into the stationary camera 10, and the information may be stored in an external storage unit.

Further, the storage control unit 11b stores association information between the device ID and the object ID transmitted from the local server 30 in the storage unit 19.

The communication control unit 11c has a function of controlling communication with an external apparatus. For example, the communication control unit 11c performs control to transmit the background image 301 in which the object detecting unit 11a misses information (the object image 302) regarding the object from which an individual can be identified from the picked up image 300 and the object ID assigned to the object image 302 to the local server 30 via the network I/F 13.

Further, the communication control unit 11c transmits the device information acquired from the information processing terminal (for example, the smartphone 2) via the wireless communication unit 15 to the local server 30 via the network I/F 13. The communication control unit 11c includes distance information indicating a distance between the stationary camera 10 and the information processing terminal in addition to the device ID in the device information when transmitting the device information to the local server 30.

Further, the communication control unit 11c receives association information between the device ID and the object ID from the local sever 30. Still further, the communication control unit 11c performs control to extract the object image 302 to which the object ID associated with the device ID included in the request is assigned from the storage unit 19 in response to a request from the local server 30 and return the object image 302 to the local server 30.

The network I/F 13 is connected to the Internet and has a function of communicating with the local server 30.

The wireless communication unit 15 performs wireless communication with an information processing terminal (mobile device) present therearound. As the communication methods, for example, Wi-Fi (registered trademark), Bluetooth (registered trademark), infrared communication, or the like, is used. Further, because the wireless communication unit 15 always tries to communicate with an information processing terminal, when an information processing terminal enters an image pickup range of the stationary camera 10, the wireless communication unit 15 can instantaneously detect that the information processing terminal enters the image pickup range and acquire the device information from the information processing terminal. An information processing terminal is detected by, for example, regular transmission of a beacon signal or confirmation whether there is a response to a probe signal. Further, when an information processing terminal is detected, information based on the distance between the stationary camera 10 and the information processing terminal (hereinafter, also referred to as "distance information") is also extracted from signal strength or delay time of transmission and reception of a signal.

The image pickup unit 17 includes a lens system configured with an image pickup lens, a diaphragm, a zoom lens, a focus lens, or the like, a drive system which makes the lens system perform focusing operation and zooming operation, a solid-state image sensor array which performs photoelectric conversion on picked up light obtained at the lens system to generate an image pickup signal, or the like. The solid-state image sensor array may be implemented by, for example, a charge coupled device (CCD) sensor array and a complementary metal oxide semiconductor (CMOS) sensor array.

The image pickup unit 17 according to the present embodiment continuously picks up images of circumferences and outputs the picked up images to the control unit 11.

In the storage unit 19, programs for executing various kinds of processing by the control unit 11 are stored. Further, the storage unit 19 stores an object image detected by the object detecting unit 11a. A data configuration example of the storage unit 19 will be described here with reference to FIG. 7.

Figures 7, 8:
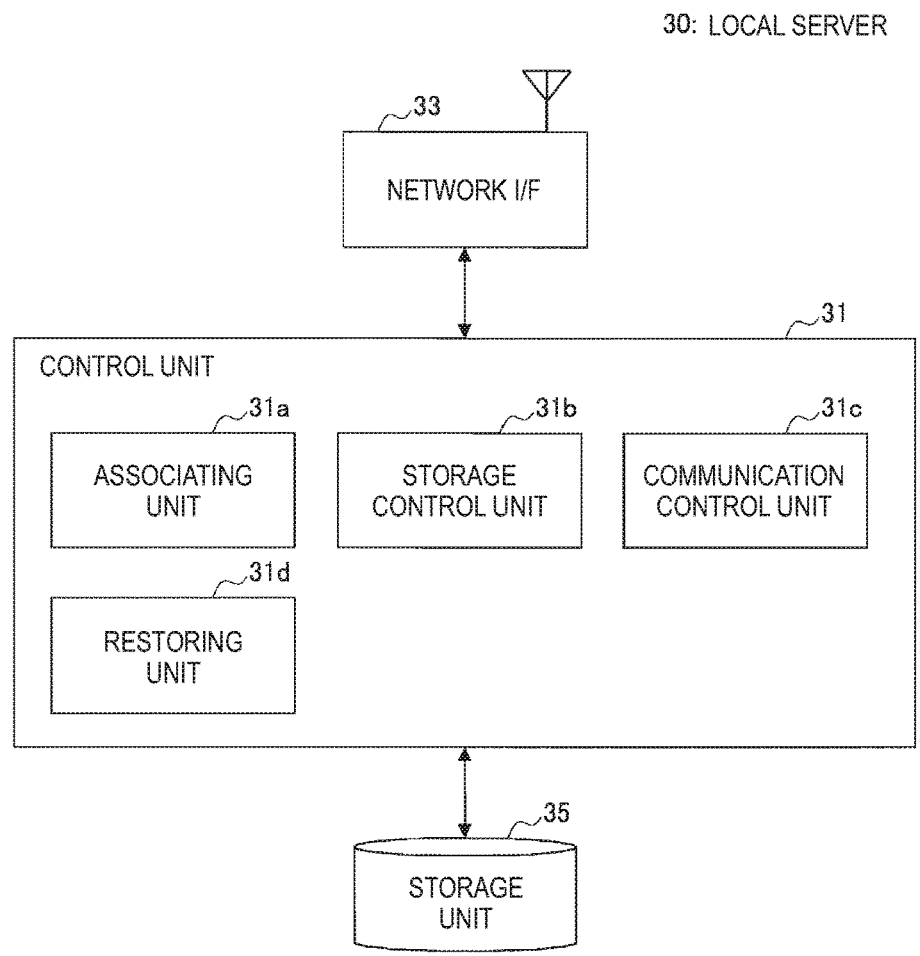
FIG. 7 is a diagram explaining a data configuration example of a storage unit of a stationary camera according to the present embodiment.
FIG. 8 is a block diagram illustrating a basic configuration example of a local server according to the present embodiment.

FIG. 7 illustrates a data configuration in which an object image is associated with an object ID and a device ID. For example, an object image 1 is associated with an object ID 1 and a device ID 1. As described above, the object ID is identification information assigned when an object image is detected from the picked up image 300 by the object detecting unit 11a. Further, the device ID is stored based on association information between the object ID and the device ID transmitted from the local server 30.

The basic configuration of the stationary camera 10 according to the present embodiment has been described above. A basic configuration of the local server 30 included in the camera system according to the present embodiment will be described next.

<2-2. Configuration Example of Local Server>

FIG. 8 is a block diagram illustrating a configuration example of the local server 30. As illustrated in FIG. 8, the local server 30 includes a control unit 31, a network I/F 33 and a storage unit 35. When the local server 30 receives an object ID from the stationary camera 10, the local server 30 starts management of the object ID.

The control unit 31 is configured with a microcomputer including, for example, a CPU, a ROM, a RAM, a non-volatile memory and an interface unit, and controls each component of the local server 30.

Further, as illustrated in FIG. 5, the control unit 31 according to the present embodiment functions as an associating unit 31a, a storage control unit 31b, a communication control unit 31c and a restoring unit 31d.

The associating unit 31a associates the object ID with the device ID, the object ID and the device ID being transmitted from the stationary camera 10. Specifically, for example, the associating unit 31a performs association based on time-series change of distance information of the device and tracked motion of an object silhouette.

First, the associating unit 31a tracks motion of the silhouette of an object (shadow object) 320 which is a portion in which information from which an individual is identified is missed in the background images 301 continuously transmitted from the stationary camera 10. At this time, the associating unit 31a can also estimate a distance between the stationary camera 10 and the silhouette as a first distance based on image processing, or the like. Further, when the background images 301 are continuously transmitted from a plurality of stationary cameras 10 in a similar manner, the associating unit 31a can track motion of the silhouette 320 in each background image 301 and detect a plurality of background images 301 in which the same object is captured. Subsequently, the associating unit 31a can judge which silhouette corresponds to the device information by comparing the motion (change of the first distance) of the silhouette (shadow object) 320 with time-series change of distance information (a second distance) indicating a distance between the stationary camera 10 and the object, included in the device information transmitted from the stationary camera 10. The associating unit 31a then associates the corresponding object ID of the silhouette with the device ID included in the device information. By this means, it is possible to realize association between an owner of the device and the object image of the owner, the object image being captured with the camera.

It should be noted that association between the object ID and the device ID according to the present embodiment is not limited to a case where association is based on the distance information, and, for example, an image marker such as an attribute according to the device ID, face recognition (characteristic pattern information of the face), and a QR code (registered trademark) may be used. That is, when the device ID includes "sex" and "age" as an owner attribute, and the object ID also includes "sex" and "age" of a target object recognized with the stationary camera 10, the associating unit 31a can judge which object corresponds to which device by comparing these "sex" and "age". Further, when the object ID includes information of a QR code read from a target object recognized with the stationary camera 10, and the information of the QR code corresponds to the device ID, the associating unit 31a can judge which object corresponds to which device.

The storage control unit 31b performs control to store the association information between the object ID and the device ID by the associating unit 31a in the storage unit 35. At this time, the storage control unit 31b associates information of a camera which captures an object and information of time at which the object is captured with the object ID and stores the information.

Further, when the storage control unit 31b acquires an information disclosure attribute (privacy level) of the device from the cloud server 38, the storage control unit 31b performs control to associate the device ID with the information disclosure attribute and store the device ID and the information disclosure attribute in the storage unit 35.

The communication control unit 31c has a function of controlling communication with the external apparatus via the network I/F 33. For example, the communication control unit 31c receives the background image 301, the object ID and the device information from the stationary camera 10. Further, the communication control unit 31c transmits the association information between the object ID and the device ID to the stationary camera 10.

Further, the communication control unit 31c performs control to inquire about the information disclosure attribute corresponding to the device ID received from the stationary camera 10 to the cloud server 38. Still further, the communication control unit 31c performs control to transmit the information disclosure attribute corresponding to the device ID to the stationary camera 10. Further, the communication control unit 31c performs control to transmit an original picked up image restored by the restoring unit 31d which will be described later to the local server 30.

The restoring unit 31d restores original image data including information from which an individual can be identified based on information which can be used for restoring an object. For example, the restoring unit 31d synthesizes the object image 302 acquired from the stationary camera 10 with the background image 301 which has been already stored in the storage unit 35 to generate the original picked up image (hereinafter, also referred to as a "restored image").

The network I/F 33 is connected to the Internet and has a function of communicating with the stationary camera 10 or the cloud server 38. Further, the network I/F 33 can be also connected to the display apparatus 30, the smartphone 2, or the like, via the network 5, and communicate with the display apparatus 40, the smartphone 2, or the like.

In the storage unit 35, programs for executing various kinds of processing by the control unit 31 are stored. Further, the storage unit 35 stores information regarding the object ID received via the network I/F 33 and information regarding the device ID. Here, a data configuration example of the storage unit 35 will be described with reference to FIG. 9.

In FIG. 9, a data configuration example of object ID related information 351a is illustrated. Specifically, the object ID is associated with the device ID, a location where the target object is stored, and image pickup date and time. For example, an object ID 1 is associated with a device ID 1, and is associated with a fact that an object image indicated with the object ID 1 is stored in the stationary camera 10A (storage location information), and a fact that the object image is picked up at 10:30:45, Feb. 17, 2014 (image pickup date and time information).

In FIG. 9, a data configuration example of device ID related information 351B is illustrated. Specifically, the device ID is associated with the privacy level (device disclosure attribute). For example, the first record of the device ID related information 351b indicates that the privacy level of the device ID 1 is "low".

A configuration of the local server 30 according to the present embodiment has been specifically described above. Subsequently, operation processing of the present embodiment will be specifically described.

3. OPERATION PROCESSING

As described in the outline with reference to FIG. 3 and FIG. 4, the camera system according to the present embodiment executes processing upon acquisition of a picked up image (see FIG. 3) and processing upon browsing of a picked up image (see FIG. 4). The processing upon acquisition of a picked up image will be specifically described below with reference to FIG. 10 to FIG. 12, and processing upon browsing of a picked up image will be specifically described next with reference to FIG. 13.

<3-1. Processing Upon Acquisition of Picked Up Image>

Figure 10:
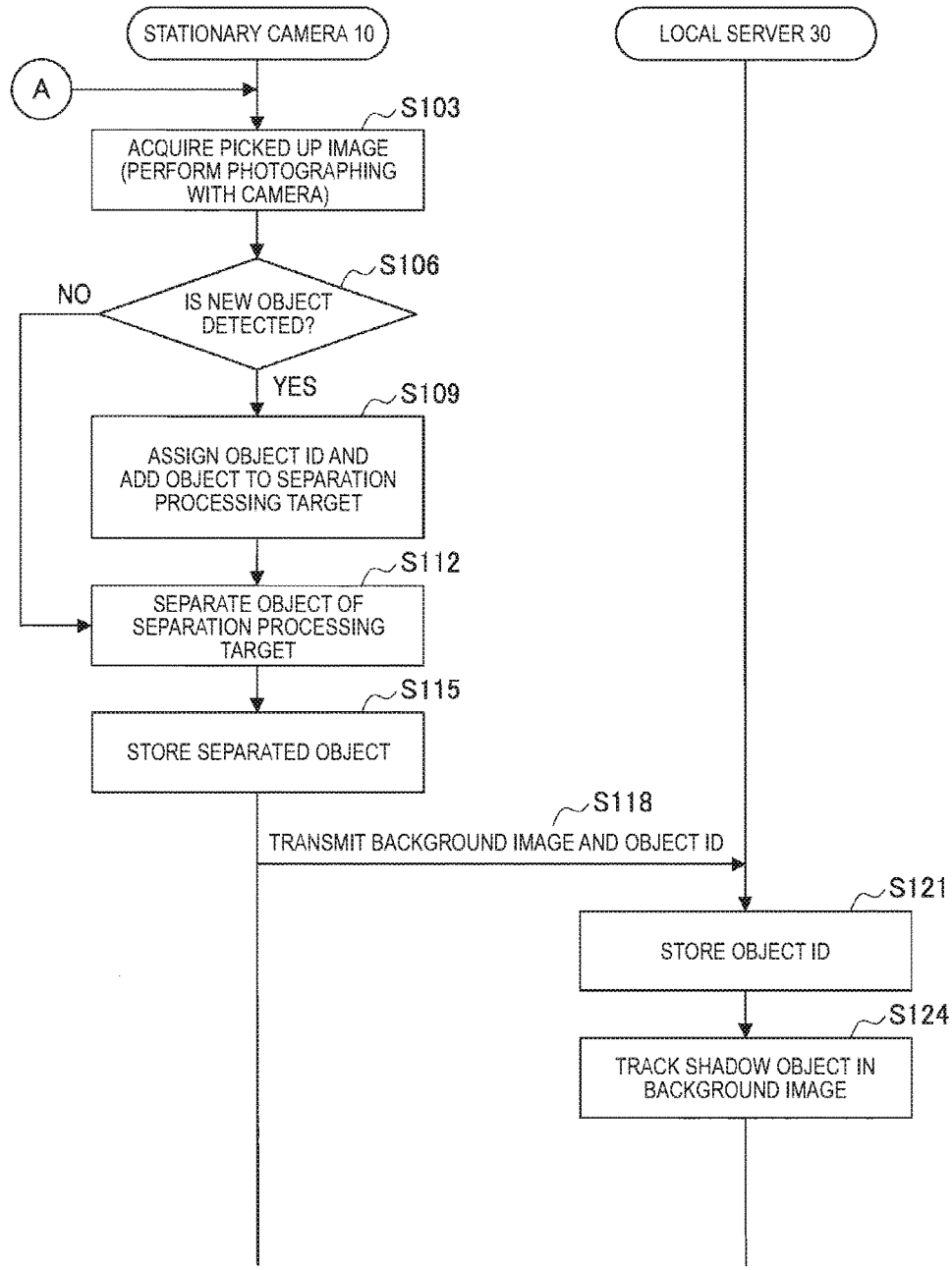
FIG. 10 is a sequence diagram illustrating processing (separation processing) upon acquisition of a picked up image according to the present embodiment.

FIG. 10 is a sequence diagram illustrating the processing upon acquisition of a picked up image (separation processing). As illustrated in FIG. 10, first, in step S103, the image pickup unit 17 of the stationary camera 10 acquires a picked up image (performs photographing with a camera).

Subsequently, in step S106, the object detecting unit 11a detects a new object from the picked up images continuously picked up by the image pickup unit 17.

Subsequently, when a new object is detected (S106/Yes), in step S109, the object detecting unit 11a assigns an object ID to the detected new object, and adds (registers) the object to a target of the following separation processing. In this manner, by adding a new object to the target of separation processing every time the new object is detected, it is possible to continue to separate the object from the picked up images continuously picked up thereafter.

Subsequently, in step S112, the object detecting unit 11a separates (extracts) an object which is a target of separation processing from the picked up image and misses information from which an individual is identified from the picked up image. It should be noted that, when a plurality of objects are registered as targets of separation processing, the object detecting unit 11a, as illustrated in FIG. 6, separates a plurality of objects 310a to 310c from the picked up image 300.

Subsequently, in step S115, the storage control unit 11b performs control to store the separated object in the storage unit 19. It should be noted that, as indicated in S142 which will be described later, while the separated object is stored in association with the device ID, even at a stage where the separated object image is not yet associated with the device ID, it is also possible to temporarily store the separated object image and associate the separated object image with the device ID later.

Subsequently, in step S118, the communication control unit 11c transmits the background image 301 from which the object is separated (in which information from which an individual is identified is missed) and the object ID assigned to the separated object to the local server 30 via the network I/F 13.

Subsequently, in step S121, the storage control unit 31b of the local server 30 stores the object ID received from the stationary camera 10 via the network I/F 33 in the storage unit 35.

Subsequently, in step S124, the associating unit 31a tracks a shadow object corresponding to the object ID (a region corresponding to the separated object) in the background image 301 received from the stationary camera 10. Because, from the stationary camera 10, the background images 301 are continuously transmitted or the background images 301 are regularly/irregularly transmitted as a moving image for a fixed period, the associating unit 31a tracks motion of the shadow object in the background image 301.

In parallel with the separation processing of the object described above, acquisition and association processing of the device information is performed. This will be described below with reference to FIG. 11.

Figure 11:
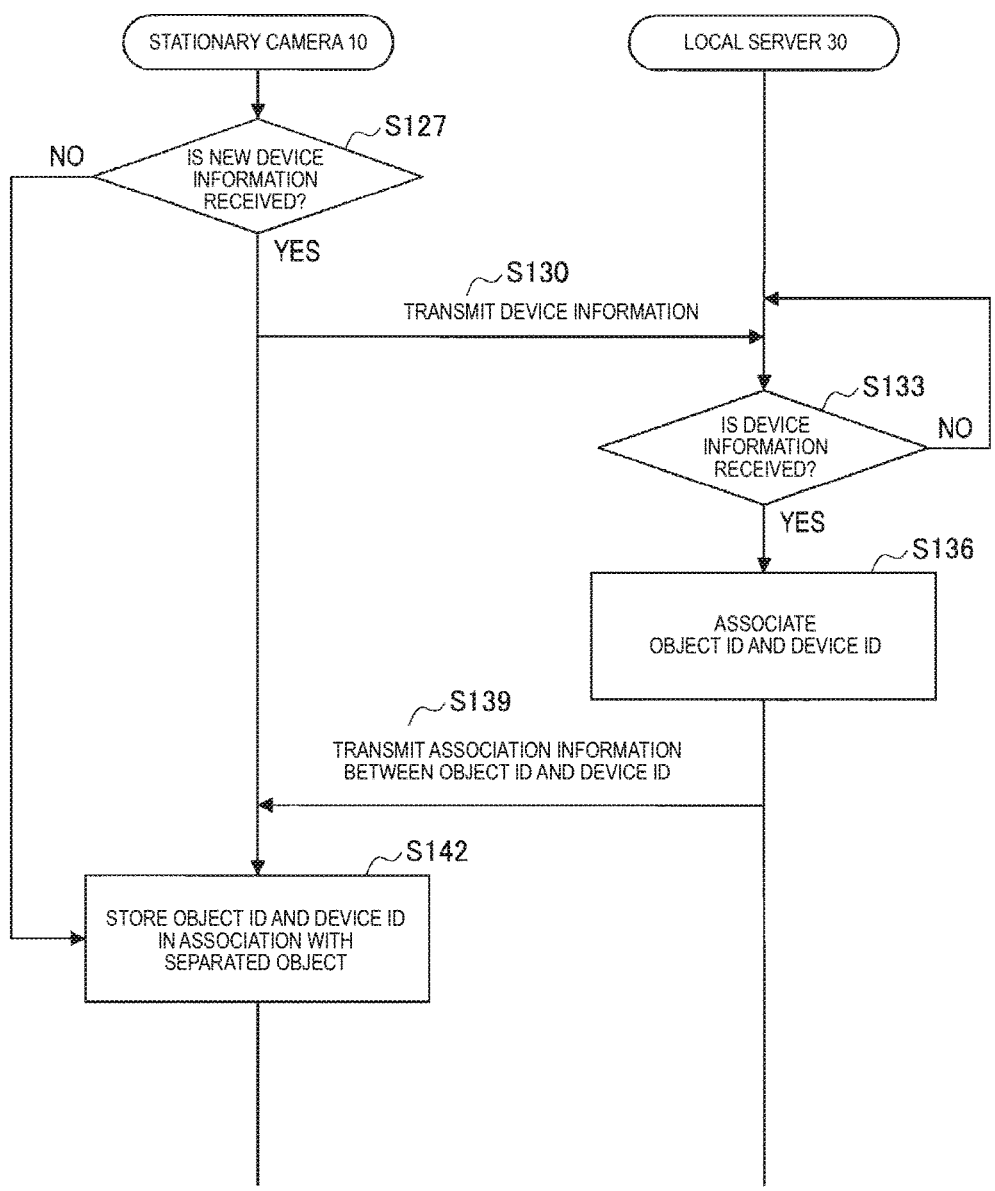
FIG. 11 is a sequence diagram illustrating processing (association processing) upon acquisition of a picked up image according to the present embodiment.

FIG. 11 is a sequence diagram illustrating processing upon acquisition of a picked up image (association processing) according to the present embodiment. First, as indicated in step S127, the stationary camera 10 receives device information of an information processing terminal (for example, the smartphone 2) present around the stationary camera 10 by the wireless communication unit 15 and detects a new device. As described above, because the stationary camera 10 always tries communication with surrounding information processing terminals, when an information processing terminal enters an image pickup range of the stationary camera 10, the stationary camera 10 can instantaneously detect that the information processing terminal enters the image pickup range and acquire device information from the information processing terminal.

Subsequently, when new device information is received (step S127/Yes), in step S130, the communication control unit 11c performs control to transmit the new device information to the local server 30 from the network I/F 13. It should be noted that while the sequence diagram illustrated in FIG. 11 illustrates a case where new device information is transmitted only once, there is also a case where new device information is transmitted a plurality of times with change of distance information, or the like. That is, the stationary camera 10 continues to extract new device information and distance information for a fixed period and continuously transmits the new device information and the distance information to the local server 30.

Subsequently, in step S133, the associating unit 31a of the local server 30 associates a device ID included in the received device information with an object ID. Specifically, the associating unit 31a judges a silhouette 320 (shadow object) of the owner of the device by comparing time-series change, or the like, of the distance information indicating a distance to the stationary camera 10, included in the device information, with motion of the silhouette 320 included in the background image 301 (motion tracked in the above-described S124). The associating unit 31a then associates the device ID with the corresponding object ID of the silhouette 320.

Subsequently, in step S139, the communication control unit 31c performs control to transmit association information between the object ID and the device ID to the stationary camera 10.

Then, in step S142, the storage control unit 31b of the stationary camera 10 performs control to associate the object ID and the device ID with the object image separated in the above-described S112 with reference to the association information received from the local server 30 and store the object ID and the device ID. It should be noted that the processing indicated in S142 may be performed in conjunction with the above-described S115. Further, as will be described later, because each processing illustrated in FIG. 10 to FIG. 12 is repeatedly performed, hereinafter, this device ID is associated with a similar object (S127/No, S142).

Subsequently, processing of deleting the object ID temporarily stored in the above-described S115 or S142 will be described with reference to FIG. 12. FIG. 12 is a sequence diagram illustrating processing upon acquisition of a picked up image (deletion processing). The processing illustrated in FIG. 12 can be performed in parallel with the processing illustrated in FIG. 10 and FIG. 11.

As illustrated in FIG. 12, first, in step S145, when new device information is received (S127/Yes), the communication control unit 11c of the stationary camera 10 inquires about an information disclosure attribute of the device to the local server 30 via the network I/F 13.

Subsequently, in step S148, the control unit 31 of the local server 30 judges whether or not the information disclosure attribute of the device which the stationary camera 10 inquires about is known.

Subsequently, when the information disclosure attribute of the device which the stationary camera 10 inquires about is not stored in the storage unit 19 (S148/No), in step S151, the communication control unit 31c inquires about the information disclosure attribute of the device to the cloud server 38.

Subsequently, in step S154, the cloud server 38 returns the information disclosure attribute of the device in response to the inquiry from local server 30.

Subsequently, when the information disclosure attribute is received (S154), or when the information disclosure attribute is known (S148/Yes), in step S157, the storage control unit 31b of the local server 30 stores association information between the device ID and the information disclosure attribute (privacy level) in the storage unit 19.

Subsequently, in step S160, the communication control unit 31c transmits the privacy level of the device corresponding to the inquiry to the stationary camera 10.

Subsequently, in step S163, the storage control unit 11b of the stationary camera 10 performs control to delete the object image associated with the device ID of the device (see the above-described S142) according to the received privacy level of the device. Specifically, the storage control unit 11b judges whether the privacy level of the device is high or low. Here, when the privacy level is "high", it indicates that disclosure is not allowed, and, when the privacy level is "low", it indicates that disclosure is allowed. Further, when the privacy level is "low", users to whom disclosure is allowed may be further specified. Specifically, for example, device IDs of users to whom disclosure is allowed are specified.

Subsequently, when the privacy level of the device is "high" (S163/Yes), in step S166, the storage control unit 11b performs control to delete the object image associated with the device ID of the device from the storage unit 19. Further, the storage control unit 11b performs control so as not to store information regarding the object thereafter. By this means, by setting the privacy level at "high" in advance by the user 3, it is possible to delete information from which a user himself/herself is identified (a picked up image of the user himself/herself) when an image of the user 3 is picked up with the stationary camera 10.

On the other hand, when the privacy level of the device is "low" (S163/No), because an object corresponding to the device can be disclosed, the object is left stored in the storage unit 19. Further, the storage control unit 11b performs control to mark the object as a target which may be stored in the storage unit 19 and store information regarding the object thereafter.

The processing upon acquisition of a picked up image according to the present embodiment has been specifically described above with reference to FIG. 10 and FIG. 11. It should be noted that the processing illustrated in FIG. 10 and FIG. 11 can be repeatedly and continuously performed. Further, in place of the above-described S160 to S163, the local server 30 may judge whether the privacy level is high or low, and, when the privacy level is "high", the local server 30 may request the stationary camera 10 to delete the object image. Subsequently, processing upon browsing of a picked up image according to the present embodiment will be described with reference to FIG. 13.

<3-2. Processing Upon Browsing of Picked Up Image>

FIG. 13 is a sequence diagram illustrating the processing upon browsing of a picked up image. It should be noted that while the local server 30 and the display apparatus 40 perform communication via the network 5 and the cloud server 38, in the sequence diagram illustrated in FIG. 13, the cloud server 38 is omitted.

First, in step S203, the display apparatus 40 makes a browsing request to the local server 30. The browsing request includes information required for specifying an image to be browsed, and, for example, includes time, location and a device ID. For example, when the user 3 desires to see a photograph at a predetermined sightseeing place which the user 3 visited 3 o'clock to 5 o'clock yesterday, the user 3 enters a device ID of the device of the user 3 in addition to the date and time and location information to the display apparatus 40 to make the display apparatus 40 issue a browsing request.

Subsequently, in step S206, the local server 30 receives the browsing request from the display apparatus 40.

Subsequently, in step S209, the storage control unit 31b of the local server 30 extracts the background image 301 at the time and location specified in the browsing request from the storage unit 35.

Subsequently, in step S212, the storage control unit 31b judges whether or not the storage control unit 31b manages the device ID included in the browsing request and checks whether there is an object ID associated with the device ID.

Subsequently, when there is no corresponding object ID (S212/No), in step S215, the communication control unit 31c performs control to transmit the extracted background image 301 to the display apparatus 40. Because the background image 301 is in a state where information from which an individual can be identified is missed, even when the background image 301 is transferred to unspecified display apparatuses 40, a problem of invasion of privacy does not occur.

On the other hand, when there is the corresponding object ID (S212/Yes), in step S218, the communication control unit 31c transmits information for specifying an image to be reproduced (such as time, location, a device ID and an object ID) to the stationary camera 10 which stores the object image corresponding to the object ID and makes an inquiry. It should be noted that the inquiry can be made as an inquiry for requesting transmission of the object image when the privacy level of the device ID corresponding to the object ID is "low".

Subsequently, in step S221, the communication control unit 11c of the stationary camera 10 extracts a target object image 302 from the storage unit 19 based on information included in the inquiry from the local server 30 and transfers the object image 302 to the local server 30.

Subsequently, in step S224, the restoring unit 31d of the local server 30 synthesizes the object image 302 received from the stationary camera 10 with the background image 301 stored in the storage unit 35 to generate an original picked up image (restored image).

It should be noted that, as illustrated in FIG. 6, when there are a plurality of separated object images, a case is also assumed where one object image among the plurality of object images is transmitted as an object image which matches the device ID, or the like, included in the inquiry. In this case, for example, only the object image 302a is transmitted, and the restoring unit 31d synthesizes the object image 302a with the background image 301 to generate a restored image. Therefore, it is possible to generate an image in which only information from which the user (the object image 302a) can be identified is restored while information from which other users (object images 302b and 302c) can be specified is missed. By this means, a problem of invasion of privacy of other users does not occur.

Subsequently, in step S227, the communication control unit 31c transmits the restored image to the display apparatus 40.

Then, in step S230, the display apparatus 40 displays the received restored image.

4. CONCLUSION

As described above, with the camera system according to the present embodiment of the present disclosure, it is possible to realize both prevention of invasion of privacy and distribution of a picked up image by distributing an image after performing processing of missing an object from which an individual can be identified (a portion where there is concern about invasion of privacy) from the picked up image.

Further, because information (restored image) which is restored and transferred to an external monitor includes only information of an object for which disclosure is allowed by an information disclosure attribute (a privacy level) registered in association with the device ID, it is possible to secure privacy of others who are photographed in the image.

The preferred embodiment of the present disclosure has been described above with reference to the accompanying drawings, whilst the present disclosure is not limited to the above examples. A person skilled in the art may find various alterations and modifications within the scope of the appended claims, and it should be understood that they will naturally come under the technical scope of the present disclosure.

For example, it is also possible to create a computer program for making hardware such as a CPU, a ROM and a RAM built into the above-described stationary camera 10 and local server 30 exert functions of the stationary camera 10 and the local server 30. Further, a computer readable storage medium having the computer program stored therein is also provided.

Further, the object ID may be assigned to the separated object at the local server 30 side.

In addition, the effects described in the present specification are merely illustrative and demonstrative, and not limitative. In other words, the technology according to the present disclosure can exhibit other effects that are evident to those skilled in the art along with or instead of the effects based on the present specification.

Additionally, the present technology may also be configured as below.

(1)

An information processing apparatus including:
an object detecting unit configured to detect an object from which an individual is identifiable from image data picked up by an image pickup unit;
a storage control unit configured to store information from which the object is restorable in a storage unit; and
a communication control unit configured to perform control to transfer to a server, image data generated by missing information regarding the object from which the individual is identifiable from the image data.

(2)

The information processing apparatus according to (1),
wherein the communication control unit further transfers an object ID corresponding to the object to the server, and
wherein the storage control unit stores the information regarding the object in association with the object ID.

(3)

The information processing apparatus according to (2),
wherein the information processing apparatus further includes a wireless communication unit configured to be able to communicate with a wireless terminal, and
wherein the communication control unit transfers to the server, a device ID of a wireless terminal detected by the wireless communication unit and information regarding a distance to the wireless terminal.

(4)

The information processing apparatus according to (3),
wherein the server manages a privacy level in unit of device ID, and the object ID and the device ID transferred to the server are associated with each other according to the distance to the wireless terminal,
wherein, as an information processing apparatus which stores information from which an object corresponding to an object ID with a high privacy level is restorable, the communication control unit receives a request for deleting the information from which the object is restorable from the server, and
wherein the storage control unit deletes the information from which the object is restorable from the storage unit in response to the request for deleting.

(5)

The information processing apparatus according to (3),
wherein the communication control unit transfers to the server, information from which an object corresponding to an object ID is restorable, the object ID being read out from the storage unit in response to a browsing request including the object ID received from the server.

(6)

An information processing apparatus including:

a communication control unit configured to receive from an external apparatus, image data in which information regarding an object from which an individual is identifiable is missed from image data picked up by an image pickup unit; and a storage control unit configured to assign an object ID to a region corresponding to the object from which the individual is identifiable and store the object ID in a storage unit in association with the image data, wherein the communication control unit performs control to return the object ID to the external apparatus.

(7)

The information processing apparatus according to (6), wherein the communication control unit receives a device ID of a wireless terminal detected by the external apparatus from the wireless terminal, the wireless terminal being placed near the external apparatus, and wherein the information processing apparatus further includes an associating unit configured to associate an object ID and the device ID with a region corresponding to the object from which the individual is identifiable.

(8)

The information processing apparatus according to (7), wherein the communication control unit receives the device ID of the wireless terminal received by the external apparatus from the wireless terminal, the wireless terminal being placed near the external apparatus, and information regarding a distance between the external apparatus and the wireless terminal, and wherein the associating unit associates the object ID with the device ID by comparing a first distance indicating a distance between the region corresponding to the object from which the individual is identifiable in the image data and the external apparatus with a second distance estimated from information regarding the distance between the external apparatus and the wireless terminal.

(9)

The information processing apparatus according to (8), wherein a privacy level is set in the device ID, and wherein the associating unit sets a privacy level of the object ID based on a device ID.

(10)

The information processing apparatus according to (9), wherein the communication control unit transmits a deletion request to an external apparatus corresponding to the object ID when the privacy level is high.

(11)

The information processing apparatus according to (9), wherein the communication control unit receives, from an external as a browsing request, time of a browsing target, information from which the external apparatus is identifiable, and a device ID, wherein the storage control unit extracts image data corresponding to the time of the browsing target from the storage unit among image data in which information regarding an object from which an individual is identifiable is missed, the image data being received from an external apparatus specified by the information from which the external apparatus is identifiable, wherein, when the privacy level set in the object ID associated with the device ID is low, the communication control unit transmits request information for requesting information from which an object corresponding to the object ID is restorable and receives the information from which the object is restorable, the information being returned in response to the request information, wherein the information processing apparatus further includes a restoring unit configured to restore original image data including information from which an individual is identifiable based on the image data extracted from the storage unit and the received information from which the object is restorable, and wherein the communication control unit transmits original image data restored by the restoring unit to the browsing request source.

(12)

A storage medium storing a program for making a computer function as:

an object detecting unit configured to detect an object from which an individual is identifiable from image data picked up by an image pickup unit;

a storage control unit configured to store information from which the object is restorable in a storage unit; and a communication control unit configured to perform control to transfer to a server, image data generated by missing information regarding the object from which the individual is identifiable from the image data.

(13)

A control method including:

receiving from an external apparatus, image data in which information regarding an object from which an individual is identifiable is missed from image data picked up by an image pickup unit;

assigning an object ID to a region corresponding to the object from which the individual is identifiable and storing the object ID in a storage unit in association with the image data; and performing control to return the object ID to the external apparatus.

REFERENCE SIGNS LIST 2 smartphone
3 user
5 network
10, 10A to 10C stationary camera
11 control unit
11a object detecting unit
11b storage control unit
11c communication control unit
13 network I/F
15 wireless communication unit
17 image pickup unit
19 storage unit
30 local server
31 control unit
31a associating unit
31b storage control unit
31c communication control unit
31d restoring unit
33 network I/F
35 storage unit
38 cloud server
40 display apparatus
41 PC
42 tablet terminal
300 picked up image
302 object image
310 object
320 silhouette (shadow object)

The invention claimed is:

1. An information processing apparatus comprising:
circuitry configured to
detect an object from which an individual is identifiable from image data picked up by an image pickup device;
store information from which the object is restorable in a memory;
perform control to transfer, to a server, image data generated by missing information regarding the object from which the individual is identifiable from the image data, an object ID corresponding to the object, and a device ID of a wireless terminal detected by the circuitry;
determine a privacy level corresponding to the device ID of the wireless terminal; and
delete the information from which the object is restorable from the memory in a case that the privacy level of wireless terminal is above a predetermined threshold value.

2. The information processing apparatus of claim 1, wherein
the circuitry is configured to store, in the memory, the information regarding the object in association with the object ID.

3. The information processing apparatus of claim 2, further comprising:
a wireless communication interface configured to communicate with the wireless terminal, wherein
the circuitry is configured to perform control to transfer, to the server, the device ID of the wireless terminal detected by the wireless communication interface and information regarding a distance to the wireless terminal.

4. The information processing apparatus of claim 3, wherein
the server manages a privacy level in unit of device ID, and the object ID and the device ID transferred to the server are associated with each other according to the distance to the wireless terminal, and
the circuitry is configured to receive, from the server, the privacy level of the wireless terminal based on the device ID.

5. The information processing apparatus of claim 3, wherein
the circuitry is configured to perform control to transfer, to the server, the information from which the object corresponding to the object ID is restorable, the object ID being read out from the memory in response to a browsing request including the object ID received from the server.

6. An information processing apparatus comprising:
circuitry configured to
receive, from an external apparatus, image data in which information regarding an object from which an individual is identifiable is missed from image data picked up by an image pickup device, a device ID of a wireless terminal detected by the external apparatus, and information regarding a distance between the external apparatus and the wireless terminal;
identify an object ID assigned to a region corresponding to the object from which the individual is identifiable and store the object ID in a memory in association with the image data;
associate the object ID with the device ID based on the information regarding the distance between the external apparatus and the wireless terminal;
set a privacy level of the object ID based on a privacy level associated with the device ID; and
transmit a deletion request to the external apparatus corresponding to the object ID when the privacy level of the object ID is greater than a predetermined threshold value.

7. The information processing apparatus of claim 6, wherein the circuitry is configured to associate the object ID with the device ID by comparing a first distance indicating a distance between the region corresponding to the object from which the individual is identifiable in the image data and the external apparatus with a second distance estimated from information regarding the distance between the external apparatus and the wireless terminal.

8. The information processing apparatus of claim 6, wherein the circuitry is configured to:
receive, from an electronic device, as a browsing request, a time of a browsing target, information from which the electronic device is identifiable, and a device ID;
extract image data corresponding to the time of the browsing target from the memory among image data in which information regarding an object from which an individual is identifiable is missed, the image data being received from an external apparatus specified by the information from which the external apparatus is identifiable;
when the privacy level set in the object ID associated with the device ID is below the predetermined threshold value, transmit request information for requesting information from which an object corresponding to the object ID is restorable; and
receive the information from which the object is restorable in response to the request information.

9. The information processing apparatus of claim 8, wherein the circuitry is configured to:
restore original image data including information from which an individual is identifiable based on the image data extracted from the memory and the received information from which the object is restorable; and
transmit restored original image data to the electronic device.

10. A method performed by an information processing apparatus, the method comprising:
receiving, from an external apparatus, image data in which information regarding an object from which an individual is identifiable is omitted from image data picked up by an image pickup device, a device ID of a wireless terminal detected by the external apparatus, and information regarding a distance between the external apparatus and the wireless terminal;
identify an object ID assigned to a region corresponding to the object from which the individual is identifiable;
store the object ID in a memory in association with the image data;
associate the object ID with the device ID based on the information regarding the distance between the external apparatus and the wireless terminal;
set a privacy level of the object ID based on a privacy level associated with the device ID; and
transmit a deletion request to the external apparatus corresponding to the object ID when the privacy level of the object ID is greater than a predetermined threshold value.

11. An electronic device comprising:
circuitry configured to
   detect a portion of an image from which an individual is identifiable from image data picked up by an image pickup device;
   store information from which the portion of the image is restorable in memory;
   transmit, to a server, second image data generated by omitting the portion of the image data from which the individual is identifiable from the image data, a first ID corresponding to the portion of the image, and a second ID corresponding to a wireless terminal detected by the information processing device;
   determine a privacy level corresponding to the device ID of the wireless terminal; and
   delete the information from which the portion of the image is restorable from the memory in a case that the privacy level of wireless terminal is above a predetermined threshold value.

12. The electronic device of claim 11, wherein
the circuitry is configured to receive, from the server, the privacy level corresponding to the device ID in response to the device ID transmitted to the server.

13. The electronic device of claim 11, further comprising:
a wireless communication interface configured to communicate with the wireless terminal, wherein
the circuitry is configured to determine a distance between the electronic device and the wireless terminal and transmit the determined distance to the server.

14. The electronic device of claim 13, wherein
the server associates the first ID and the second ID based on the determined distance between the electronic device and the wireless terminal.

* * * * *